US012671790B2

(12) United States Patent
Ramde et al.

(10) Patent No.: US 12,671,790 B2
(45) Date of Patent: \*Jun. 30, 2026

(54) PERSISTENT DIGITAL IDENTITY AND RIGHTS MANAGEMENT IN VIDEO COMMUNICATION PLATFORMS

(71) Applicant: Datacurve, Inc., Los Altos, CA (US)

(72) Inventors: Rakesh Ramde, Los Altos, CA (US); Amanjyot Singh Johar, Sunnyvale, CA (US)

(73) Assignee: Datacurve, Inc., Los Altos, CA (US)

( \* ) Notice: Subject to any disclaimer, the term of this patent is extended or adjusted under 35 U.S.C. 154(b) by 141 days.

This patent is subject to a terminal disclaimer.

(21) Appl. No.: 18/669,152

(22) Filed: May 20, 2024

(65) Prior Publication Data

US 2024/0422291 A1     Dec. 19, 2024

Related U.S. Application Data

(60) Provisional application No. 63/467,731, filed on May 19, 2023.

(51) Int. Cl.
H04N 7/15          (2006.01)
H04L 9/08          (2006.01)

(52) U.S. Cl.
CPC ........... H04N 7/155 (2013.01); H04L 9/0861 (2013.01)

(58) Field of Classification Search
None
See application file for complete search history.

(56) References Cited

U.S. PATENT DOCUMENTS

2021/0256070 A1\*   8/2021   Tran .................... G06F 16/9536
2022/0270084 A1\*   8/2022   Xue ....................... G06Q 10/40
2022/0270421 A1\*   8/2022   Carter ................... B64U 80/25

\* cited by examiner

*Primary Examiner* — Yosef K Laekemariam
(74) *Attorney, Agent, or Firm* — Law Office of Dorian Cartwright; Dorian Cartwright

(57)                ABSTRACT

Meeting participation and presentation information about an individual or project is collected from public and private systems into an electronic record. The data is represented as NFTs and stored on a block chain and used to reward participants based on their contributions and actions relating to the meeting or due to the presentation. All of this is done securely and in compliance with privacy protocols.

3 Claims, 9 Drawing Sheets

<u>100</u>

100

800

PERSISTENT DIGITAL IDENTITY AND RIGHTS MANAGEMENT IN VIDEO COMMUNICATION PLATFORMS

CROSS-REFERENCE TO RELATED APPLICATIONS

The invention claims priority under 35 USC 119 (e) to 63/467,731, entitled CHAT APPLICATION NFT TRANS-ACTIONS, and filed May 19, 2023, by Ramde et al., the contents of which are hereby incorporated in its entirety.

FIELD OF THE INVENTION

The invention relates generally to computer networks, and more specifically, to tracking, minting and exchanging NFTs via or relating to online video calls and chats or such communications in an immersive, metaverse or 3D environments.

BACKGROUND

With the growing popularity of remote chats, voice calls and video chats such as Zoom, Google Meet, WebEx and other services (or one-way video presentations over services such as Loom) more and more people meet virtually to discuss business, review assignments, assign tasks, social-ize, team build, share presentations and the like. Some of these virtual chats and calls can have just a few participants to hundreds of participants online (or perhaps just one presenting participant, as in the case of Loom). Often, tasks are assigned and reviewed, and business decisions are made or presented. Other times, projects are discussed, informa-tion is presented, team building is facilitated or input is solicited from participants. Many of these meetings are recorded.

For many of these virtual meetings, there is often no recognition of participants for their work and contributions either for their participation on the call, meeting or the video chat or as recognition for their efforts outside of the meeting or video chat. Also, there are often meeting leaders or meeting participants who add more value or who contribute more to the meeting goals or whose contribution has sig-nificant material value to the strategic objectives of a meet-ing, project or company.

With more and more participants and employees meeting virtually, business leaders and employers must manage their employees remotely. Tools exist to measure how much time employees spend in virtual meetings but there are limited tools to evaluate how effective participants were in the meeting, how much contribution the employees made to the meeting without having to go back and review recordings and notes, how effective a participant was in sharing or contributing to meeting goals or the project outcome or for the participant to more easily track, provide presentation feedback, or report and verify their contribution or partici-pation a virtual meeting or meeting goal. While individual participants may document their participation in remote meetings in calendars, spreadsheets, databases or notebooks, it is a challenge for participants to be able to show their effectiveness in contributing remotely, in the office, indi-vidually or as part of a team or project. Many "on the spur of the moment" contributions may be neglected and employ-ees or presenters may never get an opportunity to document recognition or add them to their records (for example, for performance reviews, bonuses or to verify certain contribu-tions).

Additionally, some employees spend a great deal of the time in virtual meetings throughout their day. Since many of these meetings are scheduled with start and stop times, it becomes challenging to keep track of what was accom-plished at these meetings as one meeting rolls into another.

Also, each participant may take their own set of notes or have their own way of keeping track of their projects and assignments or use different tools that may not be uniform or transparent to other users. This may make it more challenging to assign or track tasks, leading to possible misunderstandings of what was accomplished at the meet-ing, who is assigned what tasks or what is next for a particular project. Sometimes offline or follow-up meetings are needed but participants may not even know there is a misunderstanding or misalignment of goals, tasks, deliver-ables, or assignments until a later time. And, since in many cases users are remote, after an internet call, video chat, or presentation, participants aren't necessarily meeting face-to-face or running into one another at the office to clarify any concerns or questions, requiring additional online tools or the scheduling of additional online meetings. A verifiable solution to address these issues and other shortcomings is needed.

Therefore, what is needed is a robust technique for tracking, rewarding, reporting, verifying and exchanging information by participants in virtual or remote calls or presentations or immersive metaverse or 3D environments using NFTs.

SUMMARY

To meet the above-described needs, methods, computer program products, and systems for tracking and exchanging information regarding participants and participation in video conferences and chats.

In one embodiment, data is collected on the participants on a video call or chat, and NFTs can be provided to or managed by participants (or participant-permitted individu-als, such as managers, human resource (HR) departments, recruiters, professional or social media platform) and pref-erably stored in association with their user wallet. For example, data may include their name, organization, busi-ness unit, project name, products or services addressed or discussed, individual or group assignments, calendaring information, links or references to information (such as presentation or external documents), peer recognition from other participants, whether they are contracted workers or any other information regarding their employment status with the organization. In addition to a user wallet, the system may also create a decentralized identity for the users. The NFTs can have permissions associated with their permitted use or disclosure that could be controlled at a group or individual level. This decentralized identity can further be associated with the user's external accounts such as a third-party loyalty rewards program, awards, performance reviews, or a professional or social network etc.

In another embodiment, participants gather in an immer-sive metaverse or a 3D environment, optionally with a digital avatar as their representation.

For prerecorded information, the NFT can also represent how many participants listened to the presentation, where the listeners were located, how they accessed the presenta-tion, when it was listened to, project name, material pre-sented, or other metadata. In this way, the NFT can be used to provide metrics or show the effectiveness of the corre-sponding presentation or contribution.

The NFT can also be minted to represent the information or type of information discussed or disclosed. In this way, NFTs can be used to show who may have had exposure to certain information on the call or presentation, trade secrets, discussion, security clearance and the like.

Advantageously, NFTs for participants are more transparent, reliable and secure.

BRIEF DESCRIPTION OF THE DRAWINGS

In the following drawings, like reference numbers are used to refer to like elements. Although the following figures depict various examples of the invention, the invention is not limited to the examples depicted in the figures.

DETAILED DESCRIPTION

Methods, computer program products, and systems for tracking and exchanging information regarding virtual participants using NFTs. One of ordinary skill in the art will recognize many alternative embodiments that are not explicitly listed based on the following disclosure.

It is noted that while the disclosure refers to video chats or communications by multiple participants over Zoom, Microsoft Teams and like, it is understood that the benefits of using NFTs to capture or represent feedback, verification, performance, etc. and the various configurations and uses can similarly apply or be used, modified, or incorporated by one of ordinary skill in the art for one-person or pre-recorded presentations applications or platforms, such as Loom (www.loom.com), Vimeo (www.vimeo, com), TikTok, Facebook Reels, Spatial (www.spatial.io) etc. Participants listening to a prerecorded or one-way presentations on a platform or solution can still provide feedback, recognition and other disclosed benefits that can similarly get incorporated into an NFT through a button, API, SDK, user interface, etc. connected into the platform in similar or corresponding ways disclosed herein for video chat and multiparty platforms.

In the various embodiments disclosed, the NFTs can be minted to one or more participants or just the presenter as may be desirable.

I. Systems for NFT Meetings Records (FIGS. 1-6)

Figure 1:
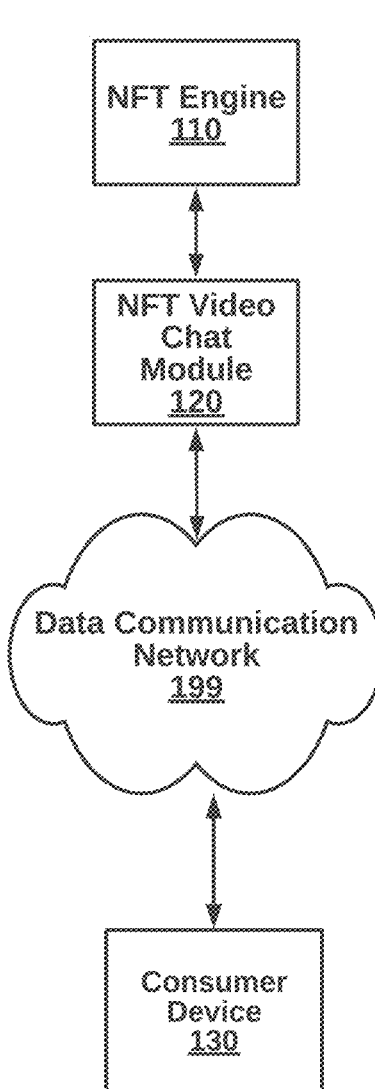
FIG. 1 is a high-level block diagram illustrating a system for tracking and exchanging information regarding virtual participants using NFTs, according to an embodiment.

FIG. 1 is a high-level block diagram illustrating a system 100 for tracking and exchanging information regarding virtual participants using NFTs, according to one embodiment. The system 100 includes an NFT engine 110, an NFT video chat module 120 (or NFT video) interacting over a data communication network 199 with a participant device 130 and virtual communication system 140, as users of the system 100. In one embodiment, the NFT engine 110 and the NFT video chat module 120 are integrated into a single system, and in another embodiment, communicate across the data communication network 199. In another embodiment, the NFT module is integrated with virtual communication software directly or via APIs or Software Development Kits (SDKs). Many other variations are possible.

In one embodiment, the NFT engine 110 mints and allocates tokens based on activity, registration, data, time or location or other triggering events and provides access to token-gated content, in response to a user satisfying specified token criteria. For example, minting a video chat NFT can be done during or after a video call to represent the attendance, contribution, feedback, award and the like to a chat participant or presenter. The NFT engine takes the complexity of the blockchain environment and abstracts it into a set of APIs and SDKs that can manage the entire process easily. For example, crypto wallets are front end technologies that require user interaction and input to mint an NFT from a smart contract. The front end can be modified or turned around to make it into a backend and middleware technology (called LogicWare), by managing the complexity away from the user and providing for interaction via APIs and SDKs. As such any front end application can now interact with the blockchain without burdening users with the intricacies of storing or managing their private keys and authorizing transactions to interact with the blockchains and mint, redeem, or create NFTs etc. A proxy process can be deployed in the backend that abstracts the user signatures as part of the transaction. At the backend, the transactions can also be handled by custodial wallets, or multi-signature wallets that can associate the transactions to the user accounts. The LogicWare backend and middleware is capable of supporting multiple applications simultaneously and while each application may be deployed by a unique customer. The NFT engine 110 maps the backend databases, digital assets, and the blockchain layer interaction with specific endpoints for functions to be executed atomically and provides a simple workflow for businesses and enterprises.

Fungible cryptographic tokens are known. For example, one type of fungible token format is the well-known ERC-20 token. Non-fungible cryptographic tokens (NFTs) are known. For example, one type of NFT format is an ERC-721 token. Both are operable with an Ethereum virtual machine (EVM). While the token formats are known, each token can be configured to create unique functionality, unique expressions, or other unique aspects of the token. An NFT is a cryptographic token that represents ownership or other rights of a designated asset, e.g., a digital file or other assets or information associated with the token. Typically, the digital file or other asset is referenced in metadata in the token definition.

Token creation (e.g., minting) and transactions are typically handled via "smart contracts" and a blockchain (e.g., the Ethereum blockchain) or other distributed ledger technology. NFTs are minted according to known token minting protocols, but each can be configured with their own parameters to create uniqueness between the tokens. With some tokens, the token may be minted on demand when the token creator decides to mint the token. Some fungible tokens are minted and initially allocated via an initial coin offering. Some tokens are "pre-mined" and subsequently allocated. For example, once minted, an NFT is typically offered for sale or acquisition via an NFT marketplace or other token sale or exchange platform.

The existing token minting and sale process suffers from various technical drawbacks and limitations as applied to the area of immersive consumer or enterprise experiences such as online meetings. For example, conventional "smart contracts" have numerous advantages but are limited in that typically they can operate only on the data contained inside the nodes of the blockchain on which they run. This makes them like a self-contained system, closed to external sources. This can be problematic when external data is needed to satisfy conditions of the smart contract.

By using a blockchain-based system and specifically NFTs for video chat and other meeting/collaboration/presentation tools, participants and enterprises can encourage more effective outcomes during meetings or from presentations, and participants can manage or grant others access to NFTs as needed. The NFTs could represent various forms of information regarding the online meeting or presentation. For example, the NFT can be minted to include or represent some form of feedback, involvement, proof of participation/attendance, training, certification, contribution, or other characteristic regarding the project, team, video chat/presentation or information discussed or presented.

NFTs can also represent tiered performance or capabilities, such as a user only being able to receive or mint an NFT if a previous contribution or level of participation was achieved. In one embodiment, if a participant or group receives one or more NFTs based on certain characteristics, then the participant or group can receive a second NFT (or simply replace the one or more previous NFTs) representing higher levels of performance or characteristics. In this way, the second NFTs can be used as proof of the underlying characteristic without having to track or report on many NFTs. Such a tiered-layer system can be configured as needed.

The decentralized nature of blockchain could also make it more difficult for unauthorized individuals to access or tamper with records or NFTs. Moreover, blockchain-based resource and communication tools could facilitate data sharing between different teams and organizations, helping to improve project coordination and reduce errors. Additionally, the use of smart contracts on a blockchain could potentially automate various aspects of employee reviews, such as for quickly gathering information regarding contributions by or to a team or project supported by verifiable data. Finally, the use of NFTs incentivizes the holders of the NFTs with recognition and rewards while reinforcing positive behaviors, skills or outcomes.

It may be noted that the LogicWare also provides for creating wallets with various ways of protecting the private keys. The private keys can be stored on a Hardware Security Module (HSM), or in Key Management Systems (KMS), whose keys may be further entrusted to an encrypted vault. The keys can also be managed using a multi-party computation (MPC) process that enables multiple parties to jointly compute a function without revealing their private inputs to each other. As part of the key management contemplated by this invention, LogicWare can distribute the private key across multiple parties in a way that ensures that no single party has access to the full private key. Instead, each party holds a share of the private key, and only by combining all shares can the full private key be reconstructed. Finally, irrespective of the key security mechanism described above, if at any time, a holder of the private key so desires, they can take complete control of their private keys via LogicWare.

For users of such a system, it is important that the system should be easy to use and provide for secure authentication. From a compliance perspective it may also be important that the system not allow for deconstruction of personal identities based on employment records. As such, authentication plays an important role. An authentication module can optionally store login information and authenticate users against the blockchain information. As detailed below, the system can deploy decentralized IDs to enable selective disclosure of information or identity attributes. A user's public key may be stored on the blockchain which allows anyone to verify the authenticity of messages, transactions, or other data associated with that identity. A user in the ecosystem (e.g., employee, administrator, HR, vendor) may store identity-related data on the blockchain, such as verifiable claims, which are claims that have been cryptographically signed by them and can be verified by others without revealing any additional information about the identity. Also, Zero knowledge proofs can be implemented to ensure that information about a user can be verified without sharing any personally identifiable information or protected information. Finally, verified credentials can also be deployed to ensure trustworthiness of the system.

A verified credential as part of this invention is a digital representation of a piece of identity-related data that has been cryptographically signed by a trusted authority. These credentials can include things like a person's name, date of birth, address, or employment records record number or any other information as defined above relevant to virtual participation. In a DID system, verified credentials are used to help establish trust between different parties. For example, when a user wants to prove their identity to a service provider (e.g., Zoom, Loom, Spatial), they can present a verified credential that has been issued by a trusted authority such as their employer, a government agency or any other trusted participant in the ecosystem. The service provider can then cryptographically verify the authenticity of the credential without having to rely on a centralized identity provider. These verified credentials can be stored on the blockchain, along with the decentralized identity and associated public keys. This allows them to be accessed and verified by anyone in the network without the need for a centralized intermediary. Additionally, because the credentials are cryptographically signed, they cannot be tampered with or altered without detection. Overall, verified credentials help to provide a more secure, private, and flexible approach to identity management, enabling individuals and organizations to assert and control their identities without relying on centralized intermediaries.

The NFT engine 110 offers a range of features to enhance user interactions within video call or metaverse communications ecosystems. Users can include employees, vendors, groups, or other participants. The engine utilizes location information from various sources to verify and establish the authenticity and provenance of user data, which can be mapped to the participant's data by employers.

Users can log into video chat applications such as Zoom, Teams, Webex, Loom, Vimeo, or YouTube, or into 3D metaverse applications powered by gaming engines like Unity or Unreal. Optionally, geofences can be configured around physical locations like office venues, conference halls, convention centers, stadiums, or arenas, restricting system interaction to participants within these areas. When users enter these geofenced areas, they can interact with the application and benefit from its features. A timestamp can also be associated with NFTs, enabling searches or classifications based on time-related aspects of chats or presentations.

The application can be triggered by various methods, including scanning a QR code, using a specific URL displayed by the venue, automatic backend configuration, SMS or message notifications, or a single sign-on (SSO) or SAML assertion within an application. Users can log in using email, social networks, SSO, or SAML assertions, and can associate their login details with a blockchain wallet address (public key) while storing the corresponding private key. The application may also create a decentralized identity wallet for users, with verified credentials mapped to their profile information. These credentials verify the decentralized identity without revealing personal information.

Users can claim digital assets by presenting their public key to an application configured with a smart contract, and can make payments via fiat, cryptocurrency, or redeem codes. The application can whitelist wallet addresses to mint assets or blacklist addresses to block interaction. Private keys are optional for redeeming assets, as the system can create NFTs or token records using system private keys or multi-signature techniques. A private key is a highly confidential key that authorizes transactions on the blockchain, proving ownership of the associated digital assets. The wallet address is the public counterpart, similar to a public address, that serves as a store of digital assets.

Governed by smart contracts, the application supports EVM-compatible or custom-developed smart contracts for specific blockchains like Near or Solana. These contracts allow for unique digital assets (ERC 721), copies of assets (ERC 1155), mixed digital assets (ERC 998), semi-fungible tokens (ERC 3525), and the rental of digital assets. Assets created via the smart contract can be imported into metaverse or 3D environments, where ownership rules mediate access and display of rewards and accolades.

The application may also enable on-the-fly smart contract deployment, creating a separate private key/wallet address pair for deployment. This deployment wallet, which may hold cryptocurrencies but no digital assets, can pay for transactions related to the digital assets or pass this cost to buyers. This solution can be part of an enterprise-deployed system, with smart contracts automatically configured and deployed via API calls in real-time, across various blockchains or test environments.

Digital assets created are stored with creative elements such as pictures, audio, or video content, and data related to the business, user, affiliates, or ecosystem partners. This data is associated with the creative elements and stored as metadata, either centrally or in a decentralized manner using protocols like IPFS or Arweave. Digital assets may or may not be transferable to other wallet addresses on the blockchain. Payment confirmations, including token IDs, are stored on the blockchain as proof of payment when tokens are minted.

In one embodiment, the NFT can be issued within one geofenced location and redeemed in another, with additional rules or user requirements overlaid on geofencing rules.

NFTs can also be redeemed or displayed on professional or social networks. The solution provides a decentralized identity for users, interoperable with various authentication mechanisms through a verified credential service built into the LogicWare platform.

The NFT engine 110, in an embodiment, mints and allocates cryptographic experiential tokens based on a virtual event held over a video chat interface or meeting event platform and entitling the user to access a meeting. In another aspect, token-gated access is granted to a resource either virtually or at a location based on location triggered events and providing access to token-gated content in response to a user satisfying specified token criteria.

The system 100 may employ computer code modules (e.g., smart contracts) configured to manage the assignment of the non-fungible cryptographic tokens to designated digital wallet addresses associated with corresponding owners of the non-fungible cryptographic tokens. Digital wallets, or e-wallets or cryptocurrency wallets, can be stored or accessed in the form of physical devices such as smart phones or other electronic devices executing an application or electronic services, online services, or software platforms. Devices serving as digital wallets may include location-based services capabilities, e.g., GPS, UWB, BLE, WiFi, NFC, and other capabilities. Digital wallets may provide a store of value or a credit or access to credit and may be in the form of a digital currency or involve a conversion to digital currency, tradeable digital asset, or other medium of exchange. The stored value accessible using a digital wallet may involve authentication to access ownership records or other indica stored in a digital ledger or DLT and requiring authentication and/or other decryption techniques to access the store of value. Parties may use digital wallets in conducting electronic financial transactions including exchanges of digital currency for goods and/or services or other considerations or items of value. Transactions may involve use of merchant or other terminal equipment and involve near field communication (NFC) features or other communication techniques and use a computer network. In addition, digital wallets may include identifying or authenticating information such as account credentials, loyalty card/account data, employment experiences and driver's license information, and the transaction may involve communicating information contained or stored in the digital wallet necessary to complete intended transactions. As such, it is advantageous to create a decentralized identity for the user, so that their personal identity is secure and protected and that their privacy is not subject to unnecessary public scrutiny.

Figure 3:
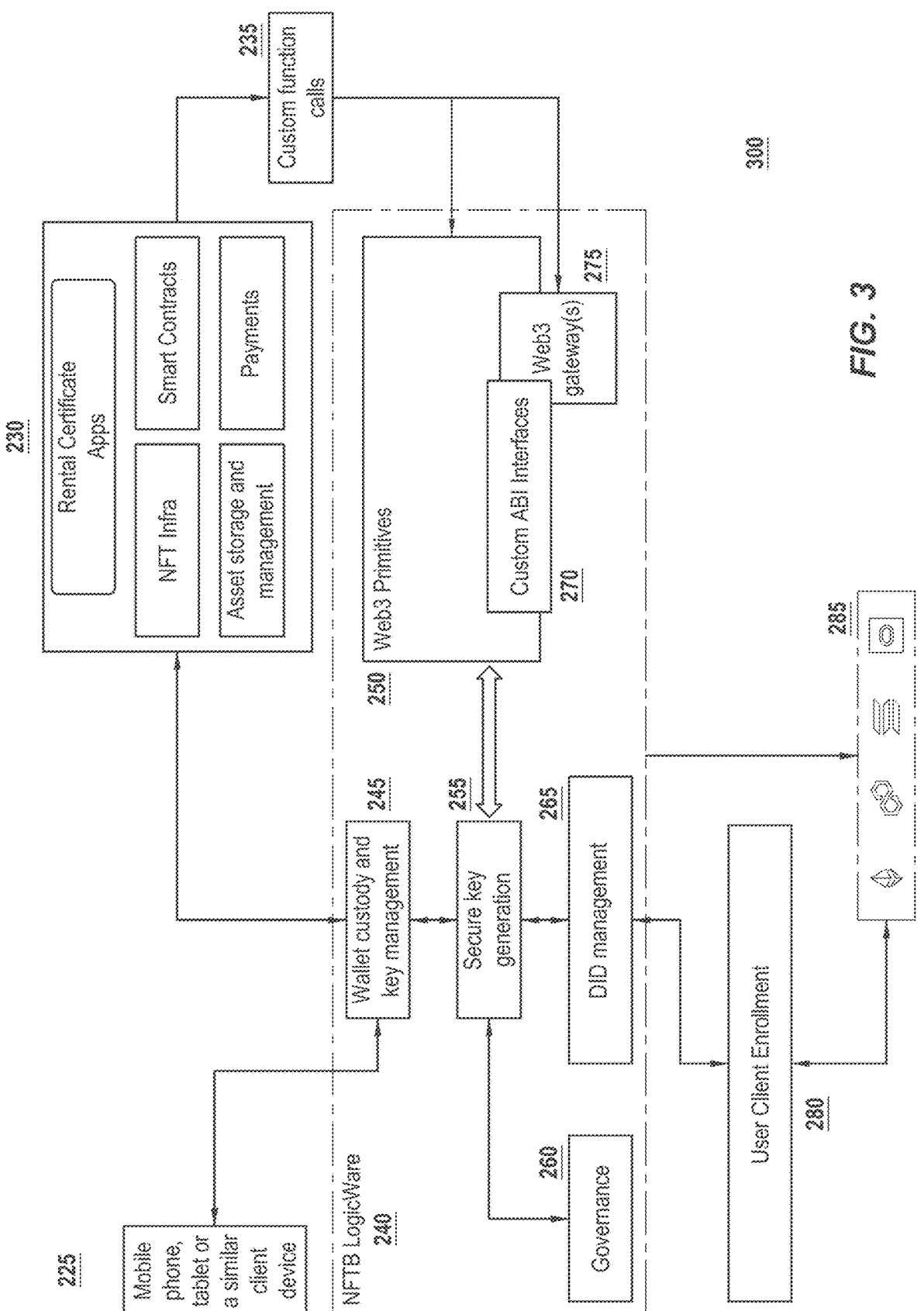
FIG. 3 is a block diagram illustrating an exemplary architectural view of a sports NFT marketplace and applications, according to an embodiment.

The NFT video chat module 120 can register and create NFTs that can operate as rewards, badges, credits and otherwise disclosed for individual users video chat participants or video presenters on a block chain. Other uses of the NFTs are also disclosed. As shown in FIG. 3, user engagement module 310 manages the employment or participant-related information about an individual user and keeps track of their individual or group contributions to the organization or project. An organization module 320 interacts with public and private systems to aggregate data for the employees/participants. Public information may include the role a user plays as an evangelist, developer, promoter, project or business manager, a sales pitch, webinars, seminars, education levels, or talks delivered by the user or generally any other user role associated with the project, team or meeting event. An NFT processing module 330 uses a backend block chain system such as NFT engine 110 for NFT and blockchain transactions, preferably transparent to users. A network module 340 uses communication channels such as Ethernet and cellular data to exchange information across the data communication network 199.

In the context of video presentations or calls, or an event in the metaverse, NFTs can be used by participants as verifiable proof that they attended a meeting. This may be useful to show that they attended a mandatory meeting, a training or education session, or participated in a particular project or meeting where a certain decision was made. Similarly, the meeting host or leader would want verifiable proof that certain participants were on a call when an important or critical conversation, presentation or decision was made without necessarily having to record a call. In these cases, while an administrator can track participants the system can provide the benefits herein without disclosing the type of information disclosed if, for example, trade secret or strategic information was discussed. Also, during or after a meeting, a meeting or project can be described based on its content, level of security applicable to the disclosures, project name, metadata or other information regarding the video chat or video chat objectives that can be recorded or linked to NFTs; in this way, an enterprise could search on characteristics associated with a video chat, for example for creating teams for future collaboration or verifying access by employees to certain information discussed on the video chat.

APIs, or application programming interfaces, are a way for different software systems to communicate and share data with each other. In the context of using NFTs to manage, track and remote participation over video-based chats and meetings, one or more APIs could be used to allow different video chat platforms or participants to request or initiate a process to issue NFTs. The process to initiate the minting request could be through any technique understood by a developer, including via an icon or button linked to or within a video chat display window, video chat frame, video chat setting, chat or dialogue window, participant contact list, participant wallet list or any other digital icon. The video chat module 120 could also be rendered where participants are shown as their avatars. The avatars could optionally contain personal information or can be configured to be anonymously accessible to other participants (e.g., by an avatar or random identifier).

In other embodiment, the video chat screen, presentation or frame can have a chat box or button (or other icon) linked to a communication interface where a first video chat participant can identify another video chat participant(s) (or the entire team) for whom the first video chat participant would like to recognize for contributions on the call or on the project. Such positive feedback could be available only between the two participants or could be shown to other participants, such as a project manager. Not only would the feedback encourage further similar efforts from the recipient but other team members could also see, verify or further validate the recognition. There could also be preset comments (e.g., "great idea", "your contributions are really valuable on this Project X", "Your presentation materials are well done") in a dialogue box or drop down menu to an interface for allowing custom responses (e.g., "Your participation and timely contribution on Project Y using your programming skills in [computer language] to implement the product feature X has allowed us to meeting the project deadlines", "the team's work with team member Z in presenting and leading this call has clearly outlined the project goals and how we plan to meet them"). A user could initiate the request to mint an NFT that would be issued/stored to a specified or created wallet. The feedback or dialogue box could be linked to a particular call or project name/identifier so that the feedback could be given on the video call, later after the video chat is completed, or later in the project when the fruits of an effort is achieved or can be recognized.

A web chat NFT system can include a registration system where participants are input directly (by a call or project leader) or imported (e.g., directly from the video chat invite list or from an organization chart) or input directly by the participants who desire to participate. The system could include wallet address information associated with the team or individuals to which NFTs could be issued and stored.

Smart contracts are self-executing contracts with the terms of the agreement between two parties being written into lines of code. In the context of using NFTs to manage NFTs for video conferences or groups, smart contracts could be used to automate certain processes and ensure that the records are always up to date and accurate. For example, a smart contract could be set up to automatically retrieve and update a person's name, project or product role, employer, feedback, recognition or other information from the user or through the communication platform. Additionally, because smart contracts are based on blockchain technology, they can provide added security and immutability to the NFT-based meetings and participation records system.

Immutable refers to the inability to modify or tamper with data once it has been recorded. Transactions and data recorded on a blockchain are immutable, which means that they cannot be altered or deleted retroactively. This immutability is achieved through cryptographic hashing and the decentralized consensus mechanisms employed by blockchain networks. The immutable nature of blockchains ensures data integrity, transparency, and an auditable trail of all activities, which is crucial for applications requiring tamper-resistant record-keeping and trustless interactions. Data can also be stored immutably over the InterPlanetary File System (IPFS), which uses content-addressing to store immutable data in a distributed file system. This complements the immutable data storage capabilities of blockchains. Data can be stored on IPFS instead of directly on a blockchain due to the significant storage constraints and costs associated with recording large amounts of data on most blockchain networks. By storing the data immutably on IPFS and recording just the content-addressed IPFS hash on the blockchain, applications can leverage the immutability and tamper-resistance of both systems while optimizing for efficient data storage.

Ingesting data is the process of importing assorted data files from one or more sources into a cloud-based or on-premise storage medium, a data warehouse, data mart, InterPlanetary File System (IPFS), decentralized storage network, or any other structured or unstructured database where it can be accessed and analyzed. This process involves extracting data from various sources, transforming it into a compatible format, and loading it into the designated storage or a processing system. Efficient data ingestion mechanisms are crucial for handling large volumes of data from multiple sources in real-time or batch modes. The ingested data can encompass various formats, including text, numerical data, audio, video, and multimedia content. The ingested data can originate from databases, log files, IoT devices, social media platforms, or any other data-generating source, enabling organizations to consolidate and derive insights from diverse data sets. Robust data ingestion pipelines ensure data integrity, scalability, and integration with downstream analytics and processing systems.

A backpack is a cryptographic construct that binds a user's digital identity, data, credentials, or any other digital assets to a non-fungible token (NFT) or other blockchain-based token. This account backpack NFT serves as a secure, portable representation of the user's identity, data, credentials, and other assets across different applications. By leveraging the immutability and trustless characteristics of blockchain technology, the account backpack provides users with self-sovereign control and management of their digital identity and assets within a unified repository while maintaining security, transparency, and an auditable record of account activity.

Binding refers to the cryptographic process of associating a user's digital identity, credentials, assets, or data with a specific blockchain token or non-fungible token (NFT). This binding establishes an inseparable link between the token and the account, ensuring that the account's contents are inextricably tied to the token's ownership and transfer. The binding mechanism leverages cryptographic primitives like digital signatures and hashing to create a secure and verifiable connection between the account data and the fungible or non-fungible tokens. Once bound, the account and its associated data can only be accessed, modified, or transferred by the rightful owner of the corresponding token, as established by the private key/wallet address pair, providing self-sovereign control over the digital assets, identity and credentials.

A series of NFTs may refer to a chronological sequence of recorded activities, actions, or occurrences. Each NET that is created in the series may be appended as an immutable entry, preserving the order and integrity of the overall series. The series of NFTs therefore allows for a transparent and auditable log of all events that have transpired within a system or process. As such, the system ensures a verifiable history that cannot be retroactively modified, enabling trustworthy record-keeping and traceability of operational activities over time.

An interval represents a specific, finite period or window of time that is consumed or utilized in its entirety. An interval has a defined start and end point. Once an interval has been allocated or assigned for a particular purpose, it cannot be reused or reassigned until it has been fully consumed or expired. This property of intervals ensures exclusivity and prevents overlapping usage conflicts within the designated time window. For example, if data from a particular interval has been converted to an NET for audit purposes, the same data may not be included in another interval for a second NFT, as it may lead to double counting of the resources utilized in the interval. Such double counting can lead to conflicts and destroy the integrity of the data.

The minted NFTs can be digital badges of a person's involvement or contribution to the project or meeting containing information or meta data that is derived from or provided by the communication platform (such as Zoom, Google Meet, Microsoft Teams, Vimeo, Loom etc.) or based on feedback/input from other project/meeting participants (during the call, presentation or after the call). These NFTs would be minted and deposited into a user wallet. Previously issued NFT can be shared or accessed if the proper permissions or other wallet access rights have been shared or granted by the wallet owner/controller.

The wallet can be an existing wallet or created as a new wallet. The wallet can be owned by the video chat participant, video presenter, project manager, company or any other person or entity. The wallet owner can use the NFT as a badge for many purposes, including to a) capture or indicate user participation, attendance or contribution on a project or in a call; b) include or represent the feedback user(s) receive from project leader or other participants during or after the video or meeting call; c) promote and incentivize more contribution and involvement from team members/participants by the project manager, company or other persons; d) be utilized by users/HR/management as part of an employees' review or progress (e.g., for annual reviews, promotions or salaries; e) prove a user's qualifications to other participants (regarding projects, education level, or work history, etc.) as way to show a user's abilities or track record; f) use by a manager or project leader to make sure they have people on the project/team with the requisite experience and capabilities; g) be used by a participant to prove their attendance on a call; h) be used in recruiting by companies or hiring managers or participants for verification/track records; i) identify participants for future projects base on previous engagement or contributions; j) reward positive contributions, insights, successful leading of a meeting or video call man, and k) prove to other third parties any of the foregoing; l) reduce fraud, resume padding, skills overstatement/mismatch; and m) identify who the other call participants are so that a participant can prove they worked with a particular person or team.

Implementing NFTs and smart contracts into an employee-based or enterprise-based system could potentially bring several benefits. First, it could make it easier for participants to evidence their attendance and participation on a video (e.g., over Zoom, Loom or the like), easier for project or meeting leaders to encourage or recognize contributions, easier to facilitate or support employee performance reviews, support team building, support hiring managers who are recruiting internally or externally within an organization, by users for badging, as the records would be stored in a decentralized and secure way. This could improve the efficiency for building teams or provide verifiable metrics for employee performance reviews, resumes, internal and external recruiting, project experience etc.

Second, using NFTs and smart contracts could help to protect against fraud and unauthorized access to a person's project, work or educational experiences. Because the records would be stored on a blockchain and controlled by smart contracts, they would be highly secure and difficult to tamper with. This could provide added peace of mind for participants and enterprises alike.

The system can also be implemented in a virtual or metaverse-type system. Also, individual participants can create or use avatars in video chats. Avatars can be linked to a wallet or use the NFTs in a similar way. Avatars can indicate badging on the avatar. In one embodiment, avatars can also be anonymous (not containing personal or identifying information) as the NFTs themselves can be used to qualify, identify or badge video participants; the NFTs would represent or contain certain information verifiable on a blockchain.

Once issued, an NFT recipient could share one or more NFTs. The NFTs could offer the recipient a number of benefits described above, including could show that a user participated on a project, verify their contribution, participate in an awards/reward program, link to a professional network (such as LinkedIn). Because of these and other benefits to recipient(s), the participants in video chats could be encouraged to contribute more while reinforcing positive efforts/outcomes and building teamwork from recognizing others and benefiting the organization or project as well.

Finally, implementing video chat NFTs and smart contracts into an employee review or performance management system could also help to reduce the potential employee slacking and project inefficiencies while encouraging team building and participation. By automating certain processes and ensuring that the records are always up to date, the system could help to improve the accuracy and reliability of the information. This could ultimately lead to better project and video meeting outcomes.

It should be noted that while the above describes a variety of use cases related to NFTs, the tips and techniques described in any one can be mixed and matched with others. For example, an NFT custodian can choose to encrypt custodial crypto wallet private keys with biometrics. Alternatively, they could choose to issue ERC998 standard tokens instead of ERC721. Token can be used to grant or track access. The permutations and combinations associated with the above are limitless and new use cases can easily be derived via a combination of some of the elements described above.

Figure 2:
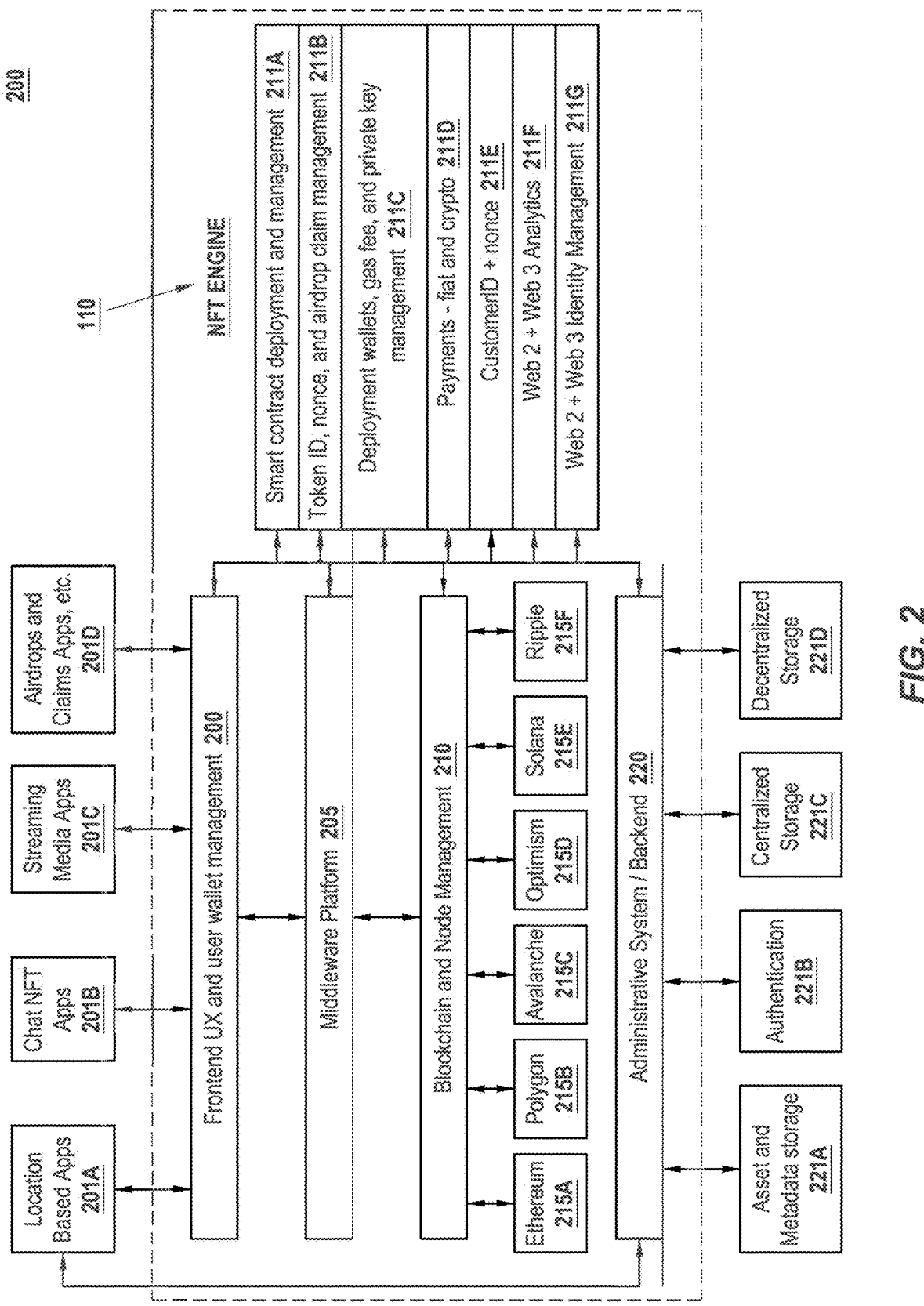
FIG. 2 is a more detailed block diagram illustrating an NFT engine of the system of FIG. 1, according to an embodiment.

FIG. 2 illustrates one embodiment of a high-level architecture of the NFT Engine and its components. Various other components and modules can be added to the NFT Engine to accommodate customized NFT requirements.

The NFT Engine 110 interfaces with a variety of other software modules including the user experience modules and the core software infrastructure modules. In one embodiment, 201A is a location-based application that is built using the NFT Engine 110. Location based apps 201A could also be a non-location based application or any other generic application that provides blockchain and NFT functionality to the users. NFT video chat apps 201B is another application or module. Other applications from a user experience perspective maybe streaming media or digital avatar apps such as 201C or AirDrop and claims applications such as 201D there may be many more applications that can be built on top of the NFT engine. These applications interface directly with the NFT engine via the front end UX and user wallet management modules 200. These applications also interface with an administrative system or a backend 220 which may be specific or customized for each application. The front end UX and user wallet management module 200 is connected to the NFT brewery middleware platform, 205, which in turn connects to blockchain and node management modules 210. It may be noted that all the components of the NFT engine may also be directly interconnected with each other to ensure proper data flow, data and identity management and access controls for the users. The administrative system or backend 220 connects to various blockchains including but not limited to Ethereum 215A, Polygon 215B, Avalanche 215C, Optimism 215D, Solana 215E, Ripple 215F, or any other EVM or non-EVM blockchain via custom RPCs and APIs. In addition the back end 220 provide support for asset and metadata storage 221A, authentication 221B, centralized storage 221C, or decentralized storage 221D. Other modules and components of the NFT Engine include:

1. Smart contract deployment and management module 211A that supports any underlying blockchain
2. TokenID, nonce, airdrop claim management modules 211B to ensure individual transactions can be processed out of sequence as well in case certain transactions are held up in the execution queue.
3. Deployment wallets and scripts, wallet management including private key management and gas management 211C, with a variety of ways for managing private keys including encryption, utilizing key vaults, multi-party computation techniques (MPC) or multi-signature wallet management.

4. Payments modules for both fiat as well as cryptocurrencies 211D via payment gateways, integrating recording the transaction results and status directly into the blockchain.
5. CustomerID and Nonce management for individual customers 211E, similar to user side described above, to ensure that transactions by different customers do not queue up and can be processed independently.
6. Integrated web2 and web3 analytics 211F to map transactional information of users to their wallets. In addition, AI techniques and algorithms can be utilized to infer behavioral information about users independent of their demographic information.
7. Integrated web2 and web3 identity management 211G that allows for access controls to be implemented based on the digital wallets, ownership of media or avatars, or any other digital goods or identity modules including SSO, SAML, etc.

FIG. 3 illustrates an exemplary high level architectural view of a sports NFT marketplace and applications using the current invention. The client in this case can be an athlete, a sports league, school, university, professional association, coaches, or any other entity or a service provider in the ecosystem. Various other components and modules can be added to this architecture to accommodate customized NFT requirements.

The end user may log in into the platform using a mobile phone tablet or similar client device (225). The application running on the device interacts with the NFT middleware platform via the NFTB LogicWare (240). The LogicWare determines the wallet custody and key management protocol, 245, that applies to the particular application (230) or the user and logs the user in into the application. If the user interacts with the application or dApp the first time, the custody and key management protocol, 245, generates a new key pair using the secure key generation module, 255, or the user and associates it with their identity. Optionally it may also associate the keys with a decentralized identity and issue verified credentials to the user. Additionally, LogicWare also creates or associates the governance policies that the user identity may be subject to. If the user is a returning user, the LogicWare retrieves the keys and based on the governance and access control rights, allows the user to access the application or the dApp. As depicted in FIG. 2 the application or dApp may consist of several components including smart contracts deployed via the module 211A or otherwise imported into the application, NFT infrastructure modules such as 211A, 211B, 211C, 211D, 211E, 211F, 211G, etc., asset storage and management (221A, 221C, 221D), or payments (211D) etc.

The application interfaces with the middleware LogicWare 240 via custom function calls APIs and SDKs 235. The LogicWare 240 for NFTs includes various web3 primitives 250 that are interoperable building blocks that are highly reliable in executing transactions over a blockchain, communicate with backend 220 and frontend 200 systems, work with storage components 221C, 221D, utilize analytics from modules such as web2 and web3 analytics 211F, identify users using the identity management module 211G, secure the applications using authentication, identity management, or implement access controls with 211G, 211B, etc. or provide for a governance layer in combination with the governance module 260. The web3 primitives 250 also communicate with custom ABI interfaces, 270, and web3 gateways 275 for deploying smart contracts to their respective blockchains, interacting with smart contracts, and executing the functions and instructions in the smart contracts.

The LogicWare optionally comprises of a governance 260 and a Decentralized Identity (DID) management module 265. DIDs are an important part of securing identity and making it interoperable across both web2 and web3 platforms.

Applications in web3 are also referred to as dApps. Governance in decentralized applications (dApps) in and communities refers to the processes and mechanisms through which decisions are made and actions are taken within the decentralized ecosystem. In traditional centralized systems, governance is typically controlled by a central authority, whereas in decentralized systems, governance is distributed among network participants. In one embodiment, the decision making and governance is in part based on the decentralized identity of the users themselves, who interact with the dApp and the associated smart contracts with their wallets and their corresponding private keys. The Governance module 260 within the NFTB LogicWare allows for implementing various governance mechanisms and resource allocations. In conjunction with the DID management module 265, the governance module 260 also employs mechanisms to prevent Sybil attacks or other malicious attacks on the system, such as, where an individual may create multiple identities to gain disproportionate influence for voting purposes. Sybil resistance mechanisms can include reputation systems, stake-weighted voting, or identity verification to ensure that governance decisions are made by genuine participants.

The DID management module 265 is a part of the web2 and web3 identity management module 211G described above. The module utilizes methods for decentralized technologies, such as distributed ledgers (e.g., blockchain) or peer-to-peer networks, to enable the creation, management, and verification of DIDs and associated digital identities. As such, the DID created for any user can be used as an identity across any blockchain and helps identify the user on the application, without compromising the user's actual identity or demographic information. The users retain full control over their DID and can choose to lock and selectively share their information using their DIDs. In particular, this is an efficient way of combining various private blockchain systems favored by enterprises, with the public blockchain systems. With a DID, a user can retain the same wallet address to make transactions over any supported blockchain.

Various blockchains may have different ways to monitor and govern the identity of the users. In order to map the identity from one system to another, it may be necessary to homogenize the identity across the multiple platforms by implementing a client enrollment module, 280, to create a system where the identities from one system may map directly to an identity on another system, without the need for any user intervention. For example, when making a private blockchain system to be compatible with a public blockchain such as Ethereum, Polygon or Solana, it may be essential to create a user (client) enrolment into the Hyperledger based system and map it to the private keys for the eventual user of the system.

Figure 5:
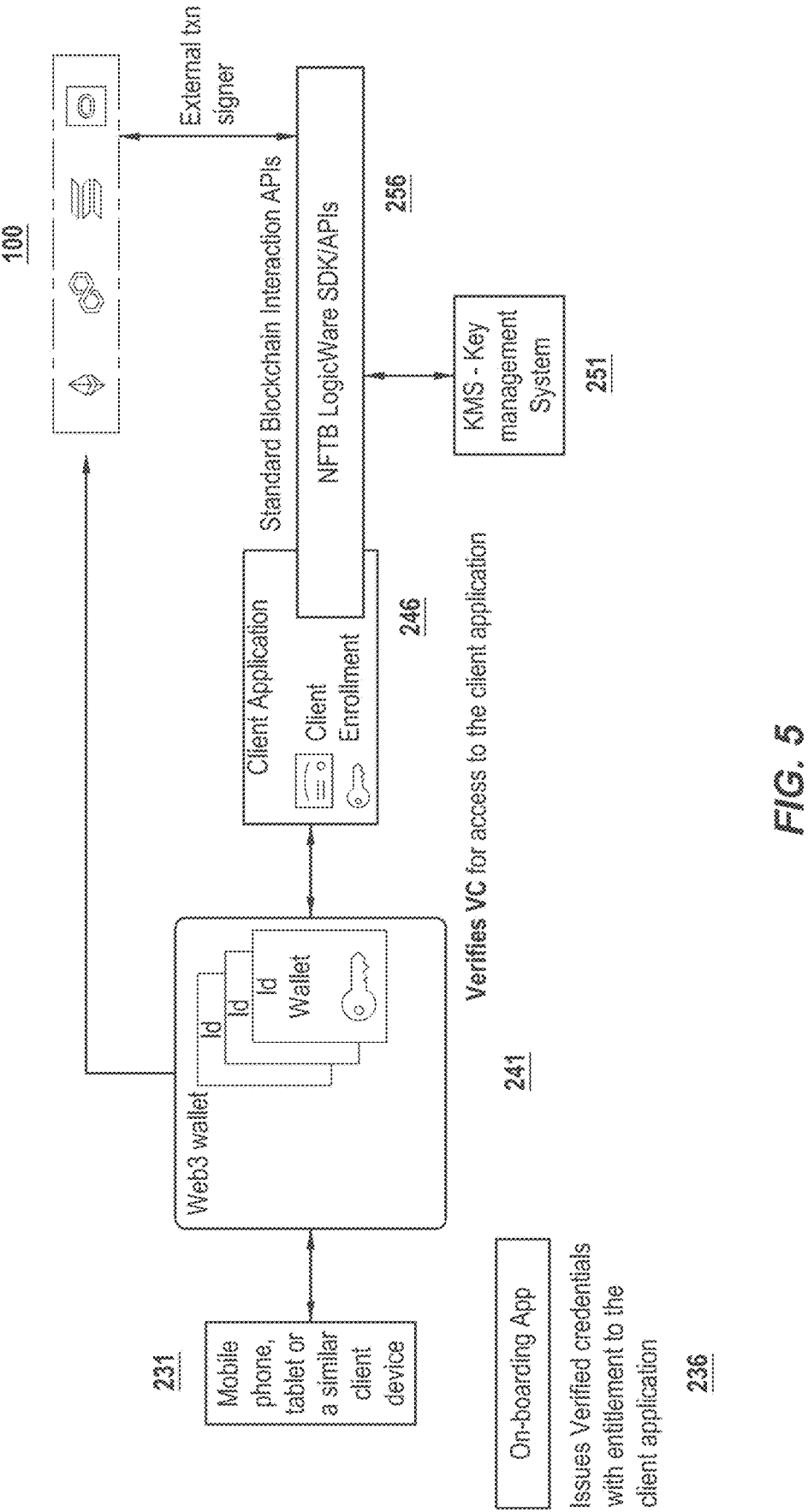
FIG. 5 illustrates the use of verified credentials (VCs) for authentication into the ecosystem of applications for access control or user onboarding features, according to an embodiment.
Figure 6:
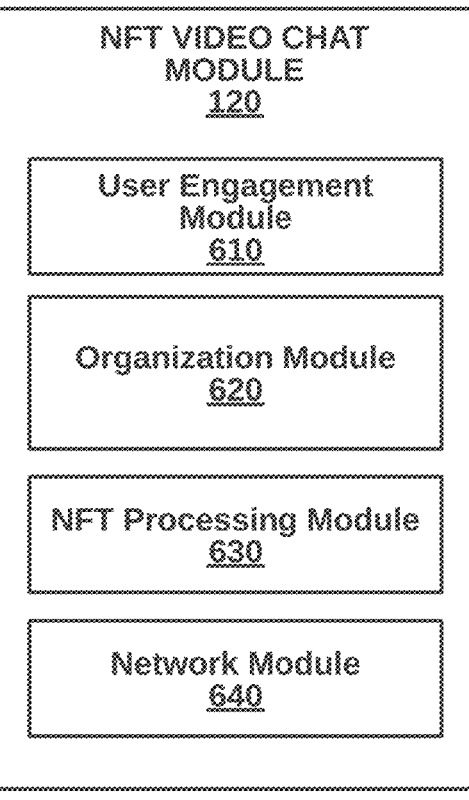
FIG. 6 is a more detailed block diagram illustrating an NFT meeting/presentation record module of the system of FIG. 1, according to an embodiment.

FIG. 5 illustrates the use of verified credentials (VCs) for authentication into the ecosystem of applications for access control or user onboarding features.

When a user logs in to the platform using a mobile phone, tablet, desktop, or a similar device, 231, the onboarding application, 236, or dApp issues a verified credential (VC), to the user. It may be noted that the VC may be issued by a third-party application separately and imported into the client application. These VCs allow the user to access other connected applications or dApps that the user may wish to, such as loyalty programs, using their decentralized identity. As such verified credentials (VCs) act as authenticating mechanism for users to use the appropriate wallets as a proxy for their identity on the system. A user may have multiple wallets associated with their identity. When a user logs in to the application or dApp, the LogicWare 256 identifies the appropriate identity to use and retrieves the appropriate keys from the key management system, 251. This in turn allows the application or dApp 246 to transact with the blockchain using the appropriate identity and the private keys associated with them. A user's public key may be stored on the blockchain which allows anyone to verify the authenticity of messages, transactions, or other data associated with that identity.

III. Methods for Video Call Records (FIG. 7-8)

Figure 7:
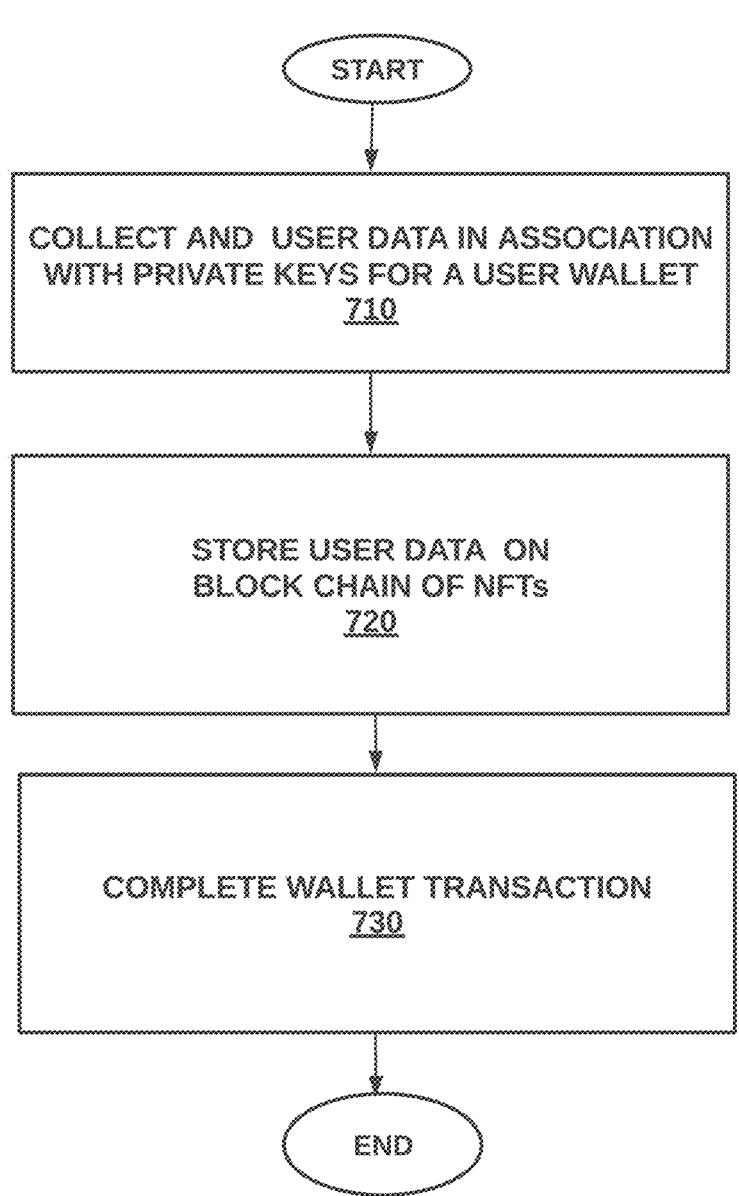
FIG. 7 is a high-level flow diagram illustrating a method for tracking and exchanging virtual participant information using NFTs, according to one embodiment.

FIG. 7 is a high-level flow diagram illustrating a method 700 for tracking and exchanging records using NFTs, according to one embodiment. At step 710, participation information about an individual is collected from public and private systems into an electronic record. At step 720, the data is stored on a block chain of NFTs and, at step 730, securely exchanged in compliance with privacy protocols. Many other variations are possible.

Figure 8:
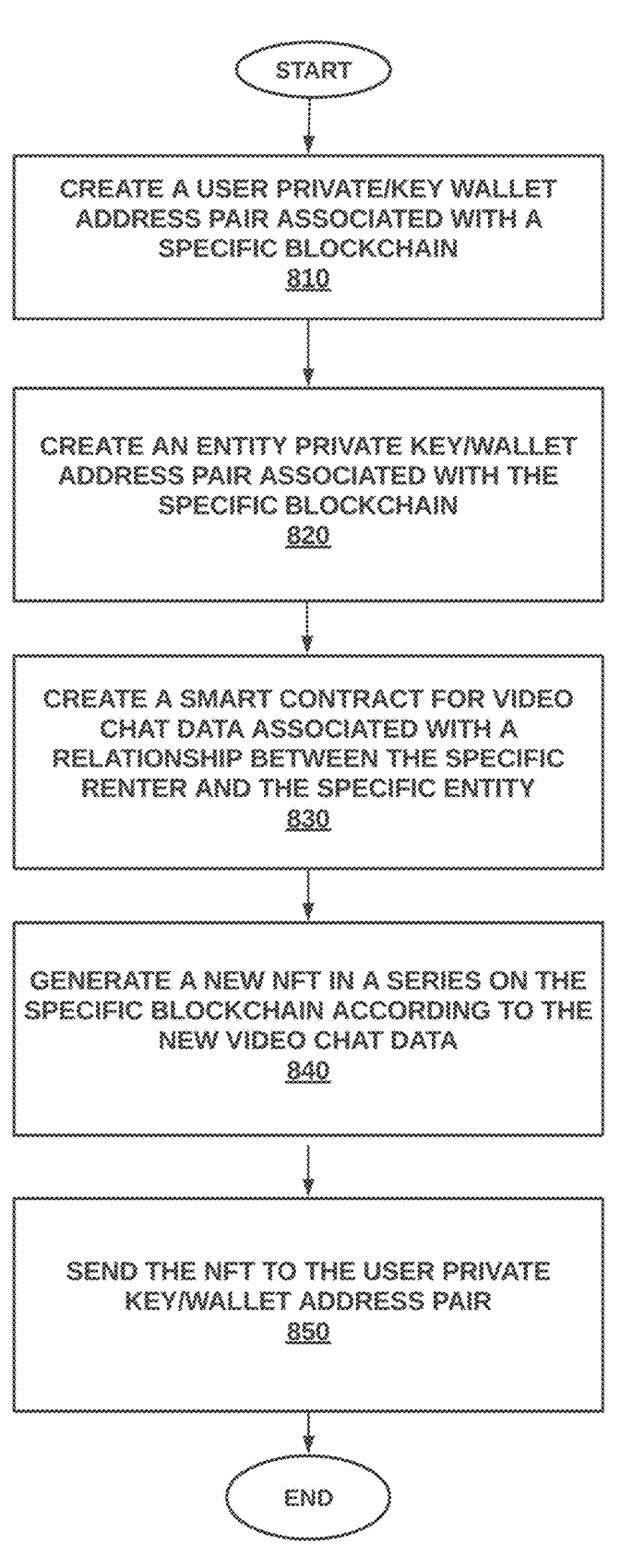
FIG. 8 is a more detailed flow diagram illustrating an alternative method for tracking and exchanging virtual participant information using NFTs, according to one embodiment.

FIG. 8 is a more detailed flow diagram illustrating an alternative method 800 for tracking and exchanging records using NFTs, according to one embodiment.

At step 810, a user private key/wallet address pair associated with a specific user to interact with the system is created. The user private key/wallet address pair is associated with a specific blockchain.

At step 820, an entity private key/wallet address pair associated with a specific entity to interact with the smart contract and store at least a portion of the user data associated with the specific user on the blockchain is created.

At step 830, a smart contract for user data associated with a relationship between a specific user and a specific entity in a video chat session history database is created.

At step 840, a new NFT in a series on the specific blockchain according to new video chat session data using the smart contract is generated and authorized by the entity private key/wallet key pair of the specific user or the specific entity to activate the video chat session history.

III. Computing Device for NFT Management (FIG. 9)

Figure 9:
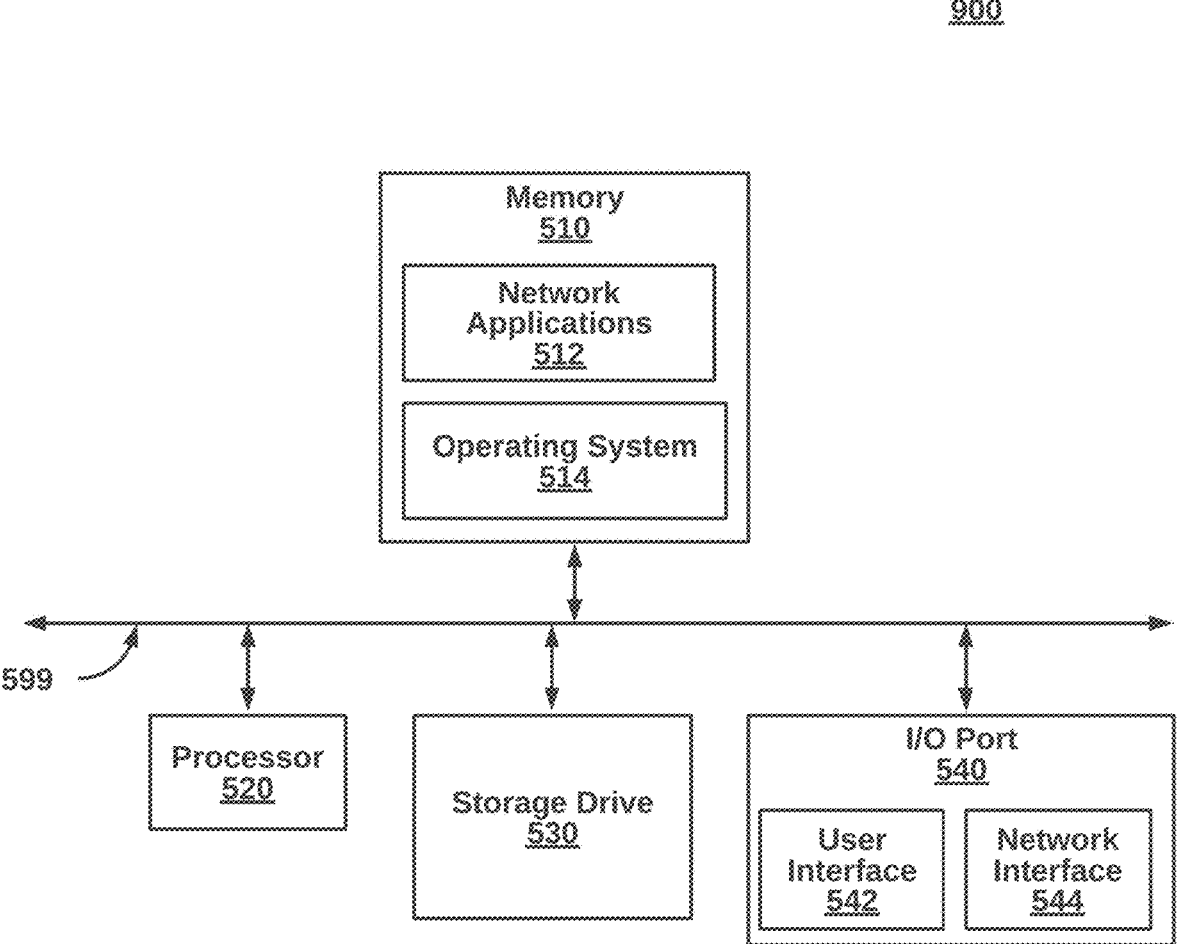
FIG. 9 is a block diagram illustrating an example computing device for the system of FIG. 1, according to one embodiment.

FIG. 9 is a block diagram illustrating a computing device 900 for use in the system 100 of FIG. 1, according to one embodiment. The computing device 900 is a non-limiting example device for implementing each of the components of the system 100, including NFT engine 110, NFT video chat module 120, and the consumer device 130. Additionally, the computing device 500 is merely an example implementation itself, since the system 100 can also be fully or partially implemented with laptop computers, tablet computers, smart cell phones, Internet access applications, and the like.

The computing device 500 of the present embodiment, includes a memory 510, a processor system 520, a hard drive 530, and an I/O port 540. Each of the components is coupled for electronic communication via a bus 599. Communication can be digital or analog and use any suitable protocol.

The memory 510 further comprises network access applications 512 and an operating system 514. Network access applications can include 512 a web browser, a mobile access application, an access application that uses networking, a remote access application executing locally, a network protocol access application, a network management access application, a network routing access applications, video and video chat software/APIs or the like.

The operating system 514 can be one of the Microsoft Windows® family of operating systems (e.g., Windows 98, 98, Me, Windows NT, Windows 2000, Windows XP, Windows XP x84 Edition, Windows Vista, Windows CE, Windows Mobile, Windows 7-11), Linux, HP-UX, UNIX, Sun OS, Solaris, Mac OS X, etc., Alpha OS, AIX, IRIX32, or IRIX84. Other operating systems may be used. Microsoft Windows is a trademark of Microsoft Corporation.

The processor 520 can be a network processor (e.g., optimized for IEEE 802.11), a general-purpose processor, an access application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 520 can be single core, multiple core, or include more than one processing elements. The processor 520 can be disposed on silicon or any other suitable material. The processor 520 can receive and execute instructions and data stored in the memory 510 or the hard drive 730.

The storage device 530 can be any non-volatile type of storage such as a magnetic disc, EPROM, Flash, or the like. The storage device 530 stores code and data for access applications.

The I/O port 540 further comprises a user interface 542 and a network interface 544. The user interface 542 can output to a display device and receive input from, for example, a keyboard. The network interface 544 connects to a medium such as Ethernet or Wi-Fi for data input and output. In one embodiment, the network interface 544 includes IEEE 802.11 antennae.

Many of the functionalities described herein can be implemented with computer software, computer hardware, or a combination.

Computer software products (e.g., non-transitory computer products storing source code) may be written in any of various suitable programming languages, such as C, C++, C#, Oracle® Java, Javascript, PHP, Python, Perl, Ruby, AJAX, and Adobe® Flash®. The computer software product may be an independent access point with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface to other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.ac, just to name a few examples). For example, signals from a computer may be transferred, at least in part, wirelessly to components or other computers.

In an embodiment, with a Web browser executing on a computer workstation system, a user accesses a system on the World Wide Web (WWW) or a meta verse through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

Figure 4:
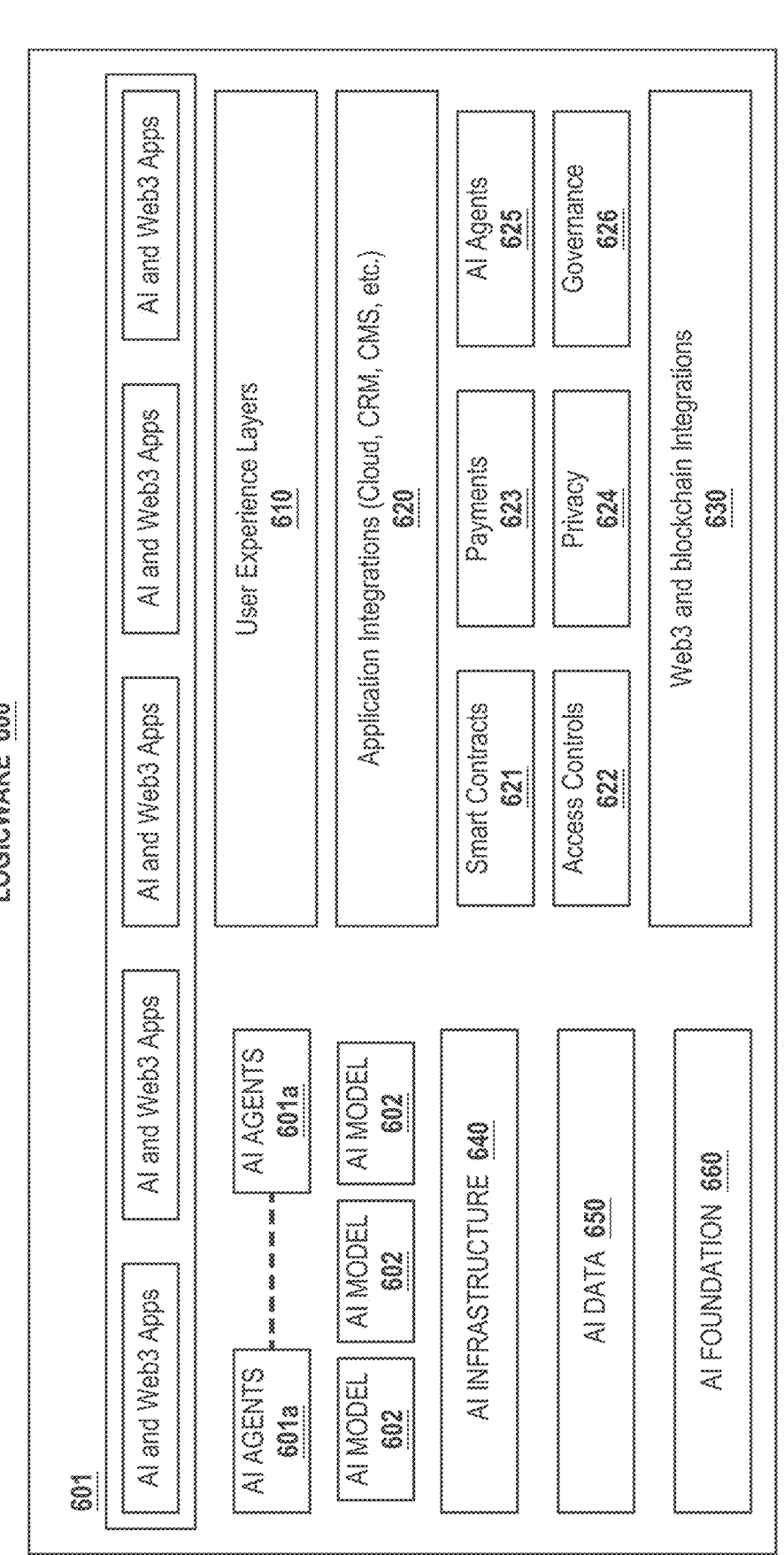
FIG. 4 is a block diagram illustrating the elements of the LogicWare with artificial intelligence, blockchain and Web3 interfaces, according to an embodiment.

FIG. 4 is a block diagram further illustrating elements of the LogicWare with blockchain, AI and Web3 interfaces.

The Logicware system 600 depicted in FIG. 4 abstracts away many of the complexities involved in building and operationalizing AI systems, enabling video chat application developers and applications to focus on leveraging AI capabilities rather than dealing with low-level infrastructure concerns. AI Foundation 660 refers to the underlying platform enabling the integration and deployment of artificial intelligence capabilities within LogicWare 600. The AI Foundation 660 serves as a common layer that provides essential services and components required for developing, deploying, and managing AI models and applications. AI Foundation may be part of the LogicWare 600 deployed as SDKs or made available to Logicware via APIs. AI Foundation may include or support the following key elements:

Data ingestion and preprocessing: Components for collecting, cleaning, and preprocessing data from various sources to prepare it for use in AI models.

Model development and training: Tools and environments for building, training, and evaluating AI models 602, such as machine learning, deep learning, or natural language processing models.

Model management: Services for versioning, storing, and managing trained AI models 602, as well as monitoring their performance and updating them as needed.

Inference and deployment: Mechanisms for deploying trained AI models into production environments, allowing video chat applications and systems to consume and leverage the AI capabilities.

Scalability and performance: Infrastructure 640 and services that enable the efficient scaling and high-performance execution of AI workloads, often involving specialized hardware like GPUs or TPUs and cloud-based services.

Security and governance: Mechanisms for ensuring the secure and compliant use of AI models, including access control, auditing, and adherence to regulatory requirements.

Integration and APIs: Interfaces with Application Integrations 630 and APIs that allow other applications and systems to seamlessly integrate with video chat and consume the AI capabilities provided by the foundation such as process systems 621-626.

AI Foundation 660 aims to provide a standardized and consistent platform for AI development and deployment with Logicware 110, across the organization, promoting reusability, scalability, and governance of AI solutions. Some of the features of the AI Foundation 660, may also integrate with cloud, CRM, CMS and other systems via Application Integrations 620.

AI Data 650 refers to the information used to train and develop artificial intelligence systems. This data can be in various forms, such as text, images, audio, video, or numerical data, depending on the application of the AI system. Ensuring the quality, relevance, and diversity of AI data is crucial for building accurate and unbiased AI models. AI data can be both structured and unstructured:

1) Structured data refers to information that is organized and formatted in a predefined way, such as databases, spreadsheets, or labeled datasets. This type of data is typically used for tasks like classification, regression, or structured prediction problems.

2) Unstructured data, on the other hand, refers to information that does not have a predefined format or structure, such as text documents, images, audio files, or social media posts. This type of data requires more preprocessing and feature extraction techniques before it can be used for training AI models.

3) Many AI applications, especially in areas like natural language processing (NLP) and computer vision, rely heavily on unstructured data, while structured data is more commonly used in fields like finance, healthcare, and manufacturing.

Logicware works with both structured and unstructured data which can also be integrated via application integrations 620.

AI infrastructure 640 refers to the combination of hardware and software resources required to develop, train, and deploy artificial intelligence systems effectively. It includes powerful computing resources, such as GPUs, TPUs, or specialized AI accelerators, to handle the computationally intensive tasks involved in training large AI models. AI infrastructure also encompasses the software platforms, frameworks, and tools used for data preprocessing, model building, training, and inferencing, which may also be a part of the AI Foundation. Additionally, AI Infrastructure 640 may involve storage and data management solutions to handle the vast amounts of data required for AI model training. The system in FIG. 8 enables robust AI infrastructure is crucial for organizations to scale their AI initiatives and achieve efficient model development and deployment cycles.

AI models are mathematical representations or algorithms that are trained on data to learn patterns, make predictions, or take actions. They are the core components of artificial intelligence systems that enable them to perform specific tasks, such as image recognition, natural language processing, or decision-making. AI models can be deep learning models, like convolutional neural networks or transformers, or more traditional machine learning models like decision trees or support vector machines. The performance and accuracy of an AI model depend on the quality and quantity of the training data, the model architecture, and the techniques used for training and optimization.

AI Agents can be used to enhance collaboration and extract insights from video chats and meetings. In one embodiment, an AI agent trained on audio and video data ingests audio and video streams in real time or recordings thereof of chats or meetings conducted on platforms such as Zoom. The AI agent extracts spoken dialogue and converts it into text transcripts. The transcribed data is then processed to extract specific information including but not limited to: identifying key points, decisions and action items to generate a summary of the meeting content; analyzing the content for sentiment analysis to gauge a participant's emotional tones and reaction to topics discussed; extracting actionable tasks and items based on a model with training datasets that meet objective criteria for dataset such as for deadlines and follow up items discussed during the conversation; quantifying the time allocated for each participant and understanding patterns for specific participants from a summary or a plurality of such video calls; searching the transcript; generating quantitative and qualitative analytics and reports about the communication dynamic and participation levels of the participants.

Using AI agents, a lot of unstructured data from the calls can also be converted to structured data affiliated with the participants and aid in enhancing the productivity, accountability, knowledge transfer of the organization while enabling a data driven decision making. It is anticipated that the output garnered from such AI agents may be utilized to create specific metadata for NFTs that can engage or reward the participants of such video chats. When used in the context of an employer, these NFTs can be useful to provide highlights from an employee's employment history including their accomplishments. Several rewards for active participation may create an immutable attestation for an employee review.

As discussed above, video chats and communications can be attested. Such attestation can be optionally recorded on a blockchain. Such attestation enables users to verify and attest to real-world information and data on the blockchain. It allows for the creation of secure, privacy-preserving attestations that can be used for various purposes, such as identity verification, credential issuance, and data authentication. By leveraging attestations on a blockchain, organizations and individuals can establish trust and transparency in the verification process, as the attestations are recorded in an immutable and tamper-proof manner. This can have significant implications for sectors like finance, healthcare, and education, where reliable attestations of identities, credentials, and data are crucial.

These attestations can simply be implemented using the Logicware platform that provides a combination of smart contracts, and off-chain data storage.

Off-Chain Data Storage: The actual sensitive datasets or documents that need to be attested (e.g., AI models or training datasets, weights, identity documents, credentials, or records etc.) are stored off-chain in a secure storage facility such as a cloud environment or a decentralized storage such as IPFS.

Hashing and Encryption: The off-chain data is hashed using cryptographic hash functions, and the resulting hash is encrypted using the public key of the attesting entity (e.g., an enterprise user who wants to submit the attestation).

Smart Contracts: A set of smart contracts deployed via the Logicware manage the attestation process. These contracts handle tasks such as:

Registering and authorizing attesting entities

Storing and verifying encrypted hashes of attested AI datasets or AI models

Issuing and revoking attestations

In addition, the Logicware platform provides APIs for attestation verification.

Attestation Issuance: When an entity wants to attest to a piece of data or document, they encrypt the hash of the datasets or the AI models using their private key and submit it to the smart contracts. The contracts record the attested hash on the blockchain, along with metadata about the attesting entity and the attestation type.

Attestation Verification: To verify an attestation, the interested party (e.g., a service provider or another entity) can use the Logicware APIs to query the smart contracts, providing the encrypted hash and attestation metadata. The smart contracts can then confirm if the attestation exists and is valid, without revealing the actual underlying data, AI datasets or AI models.

Data Retrieval: If the attestation is valid, the interested party can retrieve the encrypted hash from the blockchain and use the attesting entity's public key to decrypt it. They can then compare this hash against the hash of the AI datasets or AI models they have, confirming its authenticity and integrity.

By leveraging smart contracts, cryptographic hashing, and off-chain data storage, Logicware platform enables secure and privacy-preserving attestations on the blockchain.

These AI agents can be implemented using a variety of technical frameworks and methodologies, including but not limited to:

Machine Learning and Deep Learning: Utilizing algorithms and neural networks to analyze data, recognize patterns, and make decisions;

Natural Language Processing (NLP): Enabling the understanding and generation of human language, facilitating interactions between humans and machines;

Robotics: Applying AI in mechanical or virtual robots, connected devices, IoT (Internet of Things) devices, etc. allowing for physical interaction with environments;

Expert Systems: Incorporating rule-based systems that mimic the decision-making abilities of a human expert; and Data Analysis Systems: Designed to interpret vast datasets efficiently and accurately to derive meaningful insights.

In FIG. 4, system 400 can support a range of AI and Web3 applications via interfaces 601. AI applications can be utilized in a wide range of fields, including computer vision for object detection and recognition, natural language processing for text analysis and generation, predictive analytics for forecasting and decision support systems, as well as robotics and automation for task planning and control. The proposed invention leverages novel AI models and algorithms to achieve improved performance, efficiency, or functionality compared to existing approaches. These applications can find use in a variety of different industries and for numerous use cases such as healthcare diagnostics, financial fraud detection, recommendation systems, language processing, customer service, etc. The AI application can be implemented on various hardware platforms, such as cloud computing infrastructure, edge devices, or specialized AI accelerators, enabling scalable and cost-effective deployment.

Various cloud vendors provide platforms and services that support the development and deployment of AI agents. These cloud vendors are continuously adding support features, improved capability and services in support of their cloud offerings. Some of the major providers include Amazon Web Services (AWS) (Amazon Lex: A service for building conversational interfaces into any application using voice and text; Amazon Polly: A service that turns text into lifelike speech, allowing users to create applications that talk; Amazon Rekognition: A service for adding image and video analysis to applications; Amazon Comprehend: A natural language processing (NLP) service for understanding the content of text documents; Amazon SageMaker: A fully managed service that provides developers and data scientists with the ability to build, train, and deploy machine learning (ML) models); Microsoft Azure (Azure Bot Service: A service that enables you to build intelligent, enterprise-grade bots that help enrich the customer experience while reducing costs; Azure Cognitive Services: A set of APIs, SDKs, and services available to help developers build intelligent applications without having direct AI or data science skills; Azure Machine Learning: A cloud-based environment that a user can use to train, deploy, automate, and manage machine learning models0; Google Cloud Platform (GCP) (Google Dialogflow: A natural language understanding platform that makes it easy to design and integrate a conversational user interface into mobile app, web application, device, bot, interactive voice response system, and more; Google Cloud Speech-to-Text and Text-to-Speech: APIs for converting audio to text and vice versa; Google Cloud Vision API: Enables developers to understand the content of an image by encapsulating powerful machine learning models in an easy-to-use REST API; and Cloud Natural Language API: Provides natural language understanding technologies to developers).

These cloud vendors offer a wide range of AI and machine learning tools and services, enabling developers to create sophisticated AI agents, chatbots and virtual assistants.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical access applications. This description will enable others skilled in the art to best utilize and practice the invention in various embodiments and with various modifications as are suited to a particular use. The scope of the invention is defined by the following claims.

We claim:

1. A computer-implemented method in a system, on a data communication network, for providing immutable video chat history transactions within a non-fungible cryptographic token (NFT) based video chat session certificate, the method comprising:

creating a user private key/wallet address pair associated with a specific user to interact with the system, wherein the user private key/wallet address pair is associated with a specific blockchain;

creating an entity private key/wallet address pair associated with a specific entity to interact with a smart contract and store at least a portion of a user data associated with the specific user on the blockchain;

creating the smart contract for user data associated with a relationship between a specific user and a specific entity in a video chat session history database;

generating a new NFT in a series on the specific blockchain according to new video chat session data using the smart contract and authorized by the private key/wallet key pair of the specific user or the specific entity to activate the video chat session history; and sending the NFT to the user private key/wallet address pair.

2. A non-transitory computer-readable medium in a video chat system, on a data communication network, storing code that when executed, performs a method for capturing video chat session history using a non-fungible cryptographic token (NFT) based video chat session certificate, the method comprising:

creating a user private key/wallet address pair associated with a specific user to interact with the system, wherein the user private key/wallet address pair is associated with a specific blockchain;

creating an entity private key/wallet address pair associated with a specific entity to interact with a smart contract and store at least a portion of a user data associated with the specific user on the blockchain;

creating the smart contract for user data associated with a relationship between a specific user and a specific entity in a video chat session history database; and generating a new NFT in a series on the specific blockchain according to new video chat session data using the smart contract and authorized by the private key/ wallet key pair of the specific user or the specific entity to activate the video chat session history.

3. A video chat system, on a data communication network, for capturing video chat session history using a non-fungible cryptographic token (NFT) based on a chat session certificate, the video chat system comprising:

a processor;

a network interface communicatively coupled to the processor and to a data communication network; and a memory, communicatively coupled to the processor and storing instructions that when executed by the processor:

create a user private key/wallet address pair associated with a specific user to interact with the system, wherein the user private key/wallet address pair is associated with a specific blockchain;

create an entity private key/wallet address pair associated with a specific entity to interact with a smart contract and store at least a portion of the video chat data associated with a specific renter on the blockchain;

create the smart contract for renter data associated with a relationship between the specific user and the specific entity in a chat video session history database; and generate a new NFT in a series on the specific blockchain according to new video chat session data using the smart contract and authorized by the private key/wallet key pair of the specific user or the specific entity to activate the video chat session history.

\*　\*　\*　\*　\*